United States Patent [19]

Sasaki et al.

[11] Patent Number: 4,737,409
[45] Date of Patent: Apr. 12, 1988

[54] HEAT-RESISTANT RESIN MOLDED ARTICLE WITH EXCELLENT ABRASION RESISTANCE AND PROCESS FOR PRODUCING THE SAME

[75] Inventors: Isao Sasaki, Hiroshima; Kozi Nishida, Ohtake; Masaru Morimoto, Ohtake; Kenji Kushi, Ohtake, all of Japan

[73] Assignee: Mitsubishi Rayon Co., Ltd., Tokyo, Japan

[21] Appl. No.: 43,443

[22] Filed: Apr. 28, 1987

Related U.S. Application Data

[62] Division of Ser. No. 783,227, filed as PCT JP85/00071, Feb. 20, 1985, published as WO 85/03670, Aug. 29, 1985, Pat. No. 4,689,243.

[30] Foreign Application Priority Data

Feb. 21, 1984 [JP] Japan ................... 59-31012
Mar. 12, 1984 [JP] Japan ................... 59-46652

[51] Int. Cl.⁴ ............................................. B32B 27/06
[52] U.S. Cl. .................................... 428/336; 428/333; 428/335; 428/339; 428/473.5; 428/520
[58] Field of Search ............... 428/336, 335, 333, 339, 428/473.5, 520

[56] References Cited

U.S. PATENT DOCUMENTS

3,968,309 7/1976 Matsuo et al. ............... 428/409
4,169,924 10/1979 Barabas et al. .............. 525/377
4,246,374 1/1981 Kopchik ..................... 525/84 X

FOREIGN PATENT DOCUMENTS

2101139 1/1983 United Kingdom.

*Primary Examiner*—Theodore E. Pertilla
*Attorney, Agent, or Firm*—Oblon, Fisher, Spivak, McClelland & Maier

[57] ABSTRACT

A heat-resistant resin molded article excellent in abrasion resistance, surface smoothness, solvent resistance, durability and adhesiveness between base material and cured film, consisting of (1) a resin molded article composed of 2% by weight or more of a structural unit represented by the following structural formula

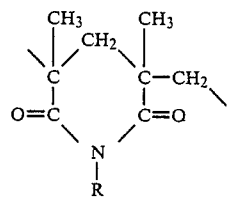

(wherein R is a hydrogen atom, an alkyl group, an aryl group or an alicyclic group of 1 to 20 carbon atoms) and 98% by weight or less of an ethylenic monomer unit and (2) a cured film formed on the surface of said resin molded article by curing a crosslinking-curable resin material containing 30% by weight or more of at least one monomer having three or more (meth)acryloyloxy groups in one molecule, as well as a process for producing said heat-resistant resin molded article.

10 Claims, 1 Drawing Sheet

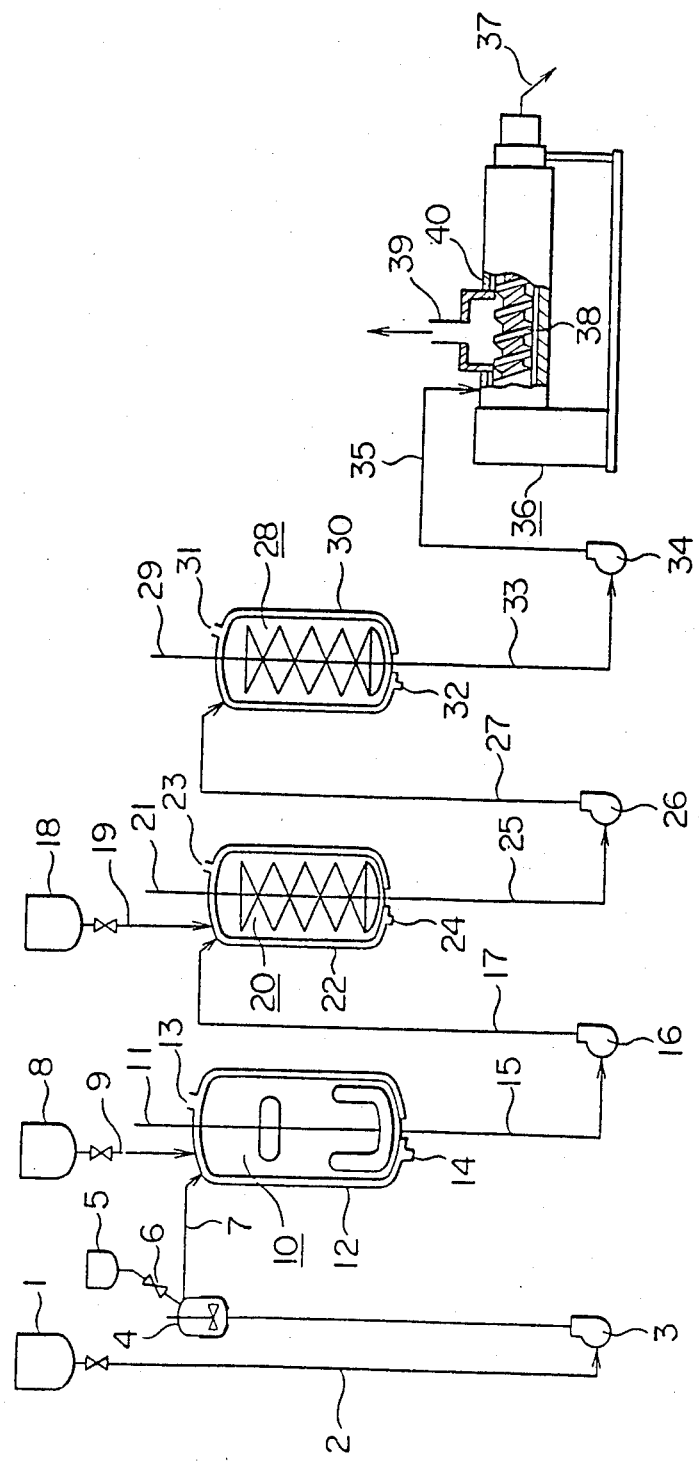

HEAT-RESISTANT RESIN MOLDED ARTICLE WITH EXCELLENT ABRASION RESISTANCE AND PROCESS FOR PRODUCING THE SAME

This is a division of application Ser. No. 783,227, filed as PCT JP85/00071, Feb. 20, 1985, published as WO 85/03670, Aug. 29, 1985, now U.S. Pat. No. 4,689,243.

TECHNICAL FIELD

This invention relates to a heat-resistant molded article with excellent abrasion resistance and process for producing said resin molded article.

More particularly, the present invention relates to a resin molded article having a two-layer structure consisting of a base material of molded resin polymer with excellent heat resistance and a crosslinking-cured coating layer excellent in abrasion resistance, surface smoothness, solvent resistance, durability and adhesiveness with said base material, as well as to a process for producing said resin molded article.

BACKGROUND ART

Polymers composed of 2% by weight or more of a structural unit represented by the following structural formula (I)

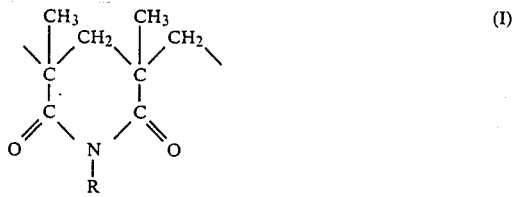

(wherein R is a hydrogen atom, an alkyl group, an aryl group or an alicyclic group of 1 to 20 carbon atoms) and 98% by weight or less of an ethylenic monomer unit, characteristically are thermoplastic and have excellent heat resistance.

However, because these polymer have insufficient surface adhesion resistance, molded articles produced therefrom are affected by contacts, impacts, scratching, etc. given by other objects during their transportation, handling or use an consequently receive damages at the surface or give reduced product yields or have deteriorated appearances.

Various methods for improving the inherent drawbacks of these synthetic resin molded articles have been investigated. Such methods include, for example, a method wherein the surface of a synthetic molded article is coated with a polyfunctional acrylate or methacrylate monomer as a crosslinking-curable coating material, having two or more polymerizable, ethylenically unsaturated groups in one molecule and the resulting coated molded article is exposed to active energy rays to form a crosslinking-cured film on the surface of the synthetic resin molded article by radical polymerization.

Such polyfunctional (meth)acrylate monomer [(meth)acrylate implies acrylate or methacrylate and this definition is applied also hereinunder] have an excellent polymerization activity when exposed to active energy rays. Therefore, these monomers are proposed as a material for quick-drying inks in U.S. Pat. Nos. 3,661,614, 3,551,311 and 3,551,246, UK Pat. No. 1,198,259, etc. Further, the application of these polyfunctional (meth)acrylate monomers as a surface improver for synthetic resin molded articles is proposed in U.S. Pat. Nos. 3,552,986, 2,413,973 and 3,770,490, etc.

Meanwhile, the present inventors too previously found that multifunctional (meth)acrylate monomers are excellent in polymerizability by crosslinking-curing when exposed to active energy rays and are an effective material for formation of a crosslinking-cured film capable of improving the surface wear resistance of synthetic resin molded articles, and have made various proposals (in, for example, Japanese Patent Publication Nos. 42,211/1973, 12,886/1974, etc.).

However, these materials for forming a crosslinking-cured film are applied in most cases only to general-purpose base materials, and a plastic base material giving a crosslinking-cured film having good adhesiveness is insufficient in heat resistance and a plastic base material having good heat resistance is insufficient in adhesiveness between plastic base materials and the crosslinking-cured film.

OBJECT OF THE INVENTION

An object of the present invention is to provide a resin polymer molded article having excellent abrasion resistance with retaining or without sacrificing the heat resistance of the heat-resistant resin polymer base material.

Another object of the present invention is to provide a resin polymer molded article having high adhesiveness between the base material and the crosslinking-cured film compared with conventional counterparts consisting of a general-purpose plastic base material and a crosslinking-cured film provided thereon.

SUMMARY OF THE INVENTION

The heat-resistant resin molded article with excellent abrasion resistance according to the present invention is characterized by consisting of a polymer resin base material composed of 2% by weight or more of a structural unit substantially of six-membered ring methacrylic imide represented by the structural formula (I)

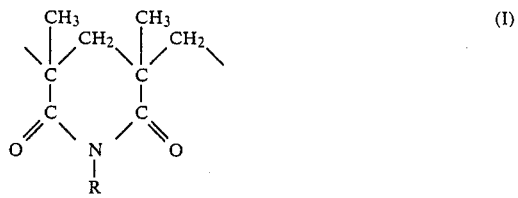

(wherein R is a hydrogen atom, an alkyl group, an aryl group or an alicyclic group of 1 to 20 carbon atoms) and 98% by weight or less of an ethylenic monomer unit and a cured film formed on the surface of said polymer resin base material by curing crosslinking-curable resin material containing 30% by weight or more of at least one monomer having three or more (meth)acryloyloxy groups in one molecule.

BRIEF EXPLANATION OF THE DRAWING

The accompanying drawing is a flow sheet of a typical apparatus used in production of methacrylimide-containing polymer.

DETAILED EXPLANATION OF THE INVENTION

The base material polymer used in production of the heat-resistant resin molded article with excellent abrasion resistance of the present invention is characterized by containing a structural unit substantially of six-membered ring imide structure as mentioned above. Due to the use of this imide structural unit, there is obtained in the present invention a heat-resistant resin base material having such excellent heat resistance, moldability and mechanical properties as conventional copolymer resins could not achieve and also having excellent productivity. By forming, on the surface of a heat-resistant resin base material having such excellent characteristics, a cured film of a crosslinking-curable resin material composed of a monomer having three or more (meth)acryloyloxy groups in one molecule, there is obtained in the present invention a resin molded article having such excellent heat resistance and abrasion resistance as could not hitherto be achieved, surprisingly strong adhesiveness between the base material and the cured film and balanced performances.

The polymer as heat-resistant resin base material of the present invention is a polymer or copolymer composed of 2% by weight or more of a structural unit substantially of six-membered ring imide represented by the above mentioned structural formula (I) and 98% by weight or less of an ethylenic monomer unit.

Of these components, the six-membered ring imide component is necessary in order for the heat-resistant resin base material to possess heat resistance, mechanical properties and strong adhesiveness with cured film.

2% by weight or more of the ring structural unit is required in the heat-resistant resin base material. In order to obtain distinct heat resistance and adhesiveness, there is required 5% by weight or more, preferably 10% by weight or more. When the ring structural unit is present in an amount less than 2% by weight, the resulting polymer molded article as base material is insufficient in heat resistance and adhesiveness with cured film. The N-substituent in the ring structure imide component is required to be a hydrogen atom, a non-substituted or substituted alkyl group, an aryl group an alicyclic group of 1 to 20 carbon atoms or a mixture of two or more of them. For improvement of heat resistance, the N-substituent is preferred to have a relatively short chain length. As the N-substituent, there are mentioned a hydrogen atom, a methyl group, an ethyl group, a propyl group, an isopropyl group, a butyl group, an isobutyl group, a tert-butyl group, a phenyl group, a substituted phenyl group, a cyclohexyl group, a bornyl group, etc. Of these, a hydrogen atom and a methyl group are most preferable.

In production of the heat-resistant resin base material of the present invention, a methacrylate resin and a compound represented by the following general formula (II)

   (II)

(wherein R is a hydrogen atom, an alkyl group, an aryl group or an alicyclic group of 1 to 20 carbon atoms) (this compound is hereinunder referred to as imidizing substance) are reacted at a temperature of 100° C. to less than 350° C. in the presence of a mixed solvent having a particular combination and then the resulting reaction mixture is freed of volatile matters. In the present invention, the above mentioned ring imide structural unit represented by the general formula (I) implies a methacrylic imide ring and the above mentioned resin molded article containing this ring imide structural unit implies a methacrylic imide-containing resin molded article. Accordingly, a methacrylic imide-containing resin molded article implies a methacrylic resin whose high molecular side chains contain methacrylic imide segments. The methacrylic resin used in the present invention process is a methyl methacrylate homopolymer or a copolymer between 25% by weight or more of methyl methacrylate and 75% by weight or less of an acrylic acid ester, a methacrylic acid ester, acrylic acid, methacrylic acid, styrene, α-methylstyrene or the like having an intrinsic viscosity of 0.01 to 3.0. As the acrylic acid ester, there are mentioned, for example, methyl acrylate, ethyl acrylate, butyl acrylate, cyclohexyl acrylate, 2-ethylhexyl acrylate, benzyl acrylate, etc.

As the methacrylic acid ester, there can be used ethyl methacrylate, butyl methacrylate, cyclohexyl methacrylate, benzyl methacrylate, etc. These monomer can be used alone or in combination of two or more.

In order to obtain a methacrylic imide-containing resin polymer, there are used two main steps of imidization reaction of methacrylic resin and separation of volatile matters from reaction mixture.

In the step of imidization reaction, a methacrylic resin and an imidizing substance are reacted to allow the high molecular side chains of the methacrylic resin to cause a condensation reaction.

In the step of separation of volatile matters from reaction mixture, the reaction mixture containing an imidized polymer formed during the reaction step is freed of volatile matters such as solvent.

In the step of imidization reaction, a methacrylic resin and an imidizing substance are reacted in the presence of a mixed solvent of particular combination. The reaction is preferably conducted after the methacrylic resin has been dissolved. As the preferable solvent, there can be mentioned alcohols such as methanol, ethanol, isopropyl alcohol, butyl alcohol and the like; aromatic hydrocarbon compounds such as benzene, xylene, toluene and the like; and so forth. A combination use of methanol and an aromatic hydrocarbon compound such as benzene, xylene, toluene or the like is preferable. The amount of solvent used is preferably small from a production standpoint; however, in order to carry out a uniform imidization reaction efficiently, it is good to use a solvent in such an amount that the concentration of polymer formed becomes 20 to 80% by weight.

As the imidizing substance represented by the general formula (II), namely, R—NH$_2$, there are mentioned primary amines such as ammonia, methylamine, ethylamine, propylamine and the like; compounds generating a primary amine when heated such as 1,3-dimethylurea, 1,3-diethylurea, 1,3-propylurea and the like; urea generating ammonia; and so forth.

There are also mentioned aromatic amines such as aniline, toluidine, trichloroaniline and the like.

There are further mentioned alicyclic amines such as cyclohexylamine, bornylamine and the like.

The amount of imidizing substance used can not be generally defined since it is depending upon the proportion of methacrylic resin to be imidized but is in a range of 1 to 200% by weight based on the amount of methacrylic resin. When the amount is less than 1% by weight, the resulting resin molded article can have neither distinctly improved heat resistance nor improved adhesiveness with cured film. The reaction between methacrylic resin and imidizing substance in a reactor is conducted at a temperature of 100° C. to less than 350° C., preferably 150° C. to less than 350° C. When the reaction temperature is less than 100° C., the imidization reaction of the methacrylic resin is slow. When the temperature is 350° C. or more, the decomposition reaction of the material methacrylic resin takes place together. The reaction time is not particularly restricted; however, it is preferably short from a productivity standpoint. 30 min to 5 hr is good.

In the imidization reaction for the methacrylic resin, presence of water in a large amount causes the hydrolysis of the ester portion (the methyl methacrylate segment), whereby it becomes difficult to produce a desired polymer containing methacrylic imide groups. Hence, it is preferable to conduct this reaction under a condition substantially free from water, namely, a condition where the water content is 1% by weight or less, preferably zero.

In the present invention, the amount of methacrylic resin to be imidized is optional but preferably 2% by weight or more, particularly 5% by weight or more in view of the heat resistance of the resulting heat-resistant resin and the adhesiveness between a resin molded article produced from said heat-resistant resin and a cured film formed on said molded article.

The reaction apparatus used in production of the methacrylic imide-containing polymer has no particular restriction unless it hinders an intended purpose. As the reaction apparatus, there are mentioned a plug flow type reaction apparatus, a screw extrusion type reaction apparatus, a column-shaped reaction apparatus, a tube type reaction apparatus, a duct-shaped reaction apparatus, a tank type reaction apparatus, etc. In order to conduct the imidization reaction uniformly, there is preferably used a tank type reaction apparatus having inlets for raw materials, an outlet for reaction mixture and a stirring means enabling stirring throughout inside the reaction apparatus.

In the step of separation of volatile matters from reaction mixture, the reaction mixture containing a condensation reaction product formed by a reaction between a methacrylic resin and a imidizing substance is freed of the most part of volatile matters, whereby the content of residual volatile matters in final polymer is reduced to 1% by weight or less, preferably 0.1% by weight or less. The removal of volatile matters can be conducted by using an ordinary means such as a vent extruder, a devolatizer or the like, or by using other method such as, for example, a method wherein the reaction mixture is diluted with a solvent, the dilution is added to a large amount of a non-dissolving type medium to precipitate the reaction product, and then the reaction product is filtered and dried.

Next, a typical apparatus used in production of the methacrylic imide-containing polymer will be explained referring to the accompanying drawing.

A solvent for imidization reaction is sent from a solvent storage tank 1 to a solvent supply tank 4 through a line 2 by a pump 3. An anti-oxidant is supplied as necessary from an anti-oxidant storage tak 5 to the solvent supply tank 4 through a line 6 and is dissolved in the solvent. Then, the solvent is sent to a resin dissolution tank 10. A resin is supplied from a resin pellet storage tank 8 to the resin dissolution tank 10 through a line 9.

The resin dissolution tank 10 is equipped with a stirrer 11 and a jacket 12. In the jacket, a heat transfer medium flows through openings 13 and 14. The dissolved resin in the resin dissolution tank 10 is sent to a reaction tank 20 through an discharge line 15, a pump 16 and a line 17. In the reaction tank 20, the dissolved resin is reacted with an imidizing agent supplied from an imidizing agent storage tank 18. The reaction tank 20 is equipped with a spiral ribbon type stirrer 21 and a jacket 22 and in the jacket a heat transfer medium flows through openings 23 and 24. The reaction mixture formed in the reaction tank 20 is sent to an aging tank 28 through a discharge line 25, a pump 26 and a line 27. The aging tank 28 is equipped with a spiral ribbon type stirrer 29 and a jacket 30 and in the jacket a heat transfer medium flows through openings 31 and 32. The aged reaction mixture is sent to a volatile matter separator 36 through a discharge line 33, a pump 34 and a line 35 to remove volatile matters. The resulting reaction product is discharged from 37.

The volatile matter separator 36 is equipped with a screw 38, a vent 39 and a heating means 40.

The methacrylic imide-containing polymer obtained from the volatile matter separator in a strand form can be subjected to pelletizing and injection molding to obtain a resin molded article base material.

In preparation of a methacrylic polymer as a raw material for the polymer of methacrylic imide ring structure, there can be used an ordinary polymerization process such as a radical polymerization process, an ion polymerization process or the like. A radical polymerization process is preferable from a productivity standpoint.

The polymerization catalyst used for obtaining the above polymer can be selected from for example, azobis type catalyst such as azobisisobutyronitrile, 2,2'-azobis(2,4-dimethylvaleronitrile) and the like, diacyl peroxide type catalysts such as lauroyl peroxide, benzoyl peroxide, bis(3,5,5-trimethylhexanoyl)peroxide and the like, percarbonate type catalysts and so forth.

In order to prevent the thermal degradation of the above polymer during its production with heating, it is possible to add a thermal degradation inhibitor such as an anti-oxidant or the like.

As the anti-oxidant in the present invention, there can be mentioned phosphite type anti-oxidant, hindered phenol type anti-oxidants, sulfur type anti-oxidants and amine type anti-oxidants.

The phosphite type anti-oxidants include phosphites such as tricresyl phosphite, cresyl phenyl phosphite, tri-n-butylphosphite, tributoxyethyl phosphite and the like.

The hindered phenol type anti-oxidants include hydroquinone, cresol, phenol derivatives, etc.

The sulfur type anti-oxidants include alkyl mercaptans, dialkyl disulfide derivatives, etc.

The amine type anti-oxidants include naphthylamine, phenylenediamine, hydroquinoline derivatives, etc.

On the surface of the heat-resistant resin molded article is formed a cured film of a crosslinking-curable resin material, whereby a resin molded article with excellent abrasion resistance is produced.

As the crosslinking-curable resin material, there can be used various materials having crosslinking-curable groups in one molecule. In view of abrasion resistance, adhesiveness with plastic base material and transparency, preferable are crosslinking-curable resin materials containing 30% by weight or more of at least one monomer having three or more (meth)acryloyloxy groups as crosslinking-curable unsaturated group within the molecule.

As the monomer having three or more acryloyloxy and/or methacryloyloxy group in one molecule, there can be mentioned polyacrylates or polymethacrylates of polyhydric alcohols such as trimethylolpropane triacrylate or trimethacrylate, trimethylolethane triacrylate or trimethacrylate, pentaglycerol triacrylate or trimethacrylate, pentaerythritol triacrylate or trimethacrylate, pentaerythritol tetraacrylate or tetramethacrylate, glycerine triacrylate or trimethacrylate, dipentaerythritol triacrylate or trimethacrylate, dipentaerythritol tetraacrylate or tetramethacrylate, dipentaerythritol pentaacrylate or pentamethacrylate, dipentaerythritol hexaacrylate or hexamethacrylate, tripentaerythritol tetraacrylate or tetramethacrylate, tripentaerythritol pentaacrylate or pentamethacrylate, tripentaerythritol hexaacrylate or hexamethacrylate, tripentaerythritol heptaacrylate or heptamethacrylate and the like; saturated or unsaturated polyester polyacrylates or polymethacrylates obtained from compound combinations such as malonic acid/trimethylolethane/acrylic acid or methacrylic acid, malonic acid/trimethylolpropane/acrylic acid or methacrylic acid, malonic acnd/glycerine/acrylic acid or methacrylic acid, malonic acid/pentaerythritol/acrylic acid or methacrylic acid, succinic acid/trimethylolethane/acrylic acid or methacrylic acid, succinic acid/trimethylolpropane/acrylic acid or methacrylic acid, succinic acid/glyercine/acrylic acid or methacrylic acid, succinic acid/pentaerythritol/acrylic acid or methacrylic acid, adipic acid/trimethylolethane/acrylic acid or methacrylic acid, adipic acid/trimethylolpropane/acrylic acid or methacrylic acid, adipic acid/pentaerythritol/acrylic acid or methacrylic acid, adipic acid/glycerine/acrylic acid or methacrylic acid, glutaric acid/trimethylolethane/acrylic acid or methacrylic acid, glutaric acid/trimethylolpropane/acrylic acid or methacrylic acid, glutaric acid/glycerine/acrylic acid or methacrylic acid, glutaric acid/pentaerythritol/acrylic acid or methacrylic acid, sebacic acid/trimethylolethane/acrylic acid or methacrylic acid, sebacic acid/trimethylolpropane/acrylic acid or methacrylic acid, sebacic acid/glycerine/acrylic acid or methacrylic acid, sebacic acid/pentaerythritol/acrylic acid or methacrylic acid, fumaric acid/trimethylolethane/acrylic acid or methacrylic acid, fumaric acid/trimethylolpropane/acrylic acid or methacrylic acid, fumaric acid/glycerine/acrylic acid or methacrylic acid, fumaric acid/pentaerythritol/acrylic acid or methacrylic acid, itaconic acid/trimethylolethane/acrylic acid or methacrylic acid, itaconic acid/trimethylolpropane/acrylic acid or methacrylic acid, itaconic acid/pentaerythritol/acrylic acid or methacrylic acid, maleic anhydride/trimethylolethane/acrylic acid or methacrylic acid, maleic anhydride/glycerine/acrylic acid or methacrylic acid, and the like; urethane acrylates obtained by reacting 1 mole of a polyisocyanate[e.g. trimethylolpropane toluylene diisocyanate, a polyisocyanate represented by the following general formula

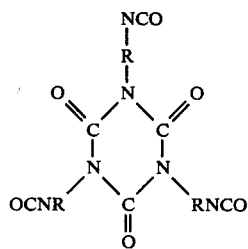

(wherein R is hexamethylene diisocyanate, tolylene diisocyanate, diphenylmethane diisocyanate, xylylene diisocyanate, 4,4'-methylenebis(cyclohexylisocyanate), isophorone diisocyanate or trimethyl hexamethylene diisocyanate)] with at least 3 moles of an acrylic monomer containing active hydrogen (e.g. 2-hydroxyethyl acrylate or methacrylate, 2-hydroxypropyl acrylate or methacrylate, 2-hydroxy-3-methoxypropyl acrylate or methacrylate, N-methylolacrylamide or N-methylolmethacrylamide, N-hydroxyacrylamide or N-hydroxymethacrylamide) according to an ordinary method; and poly[(meth)acryloyloxyethyl]isocyanurates such as triacrylate or trimethacrylate of tris-(2-hydroxyethyl)isocyanuric acid and the like.

Particularly preferable as the monomer having three or more (meth)acryloyloxy groups within the molecule are compounds represented by the following general formula

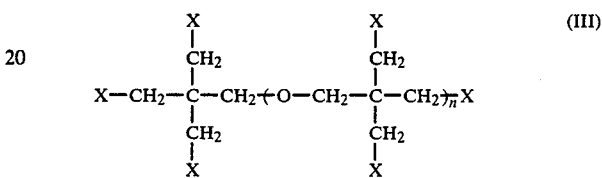

wherein n is a positive integer of 1 to 4, at least three of the Xs are a $CH_2=CH-COO-$ group or a $CH_2=C(CH_3)COO-$ group, and the remainder of the Xs is an $-OH$ group.

Specific examples of the monomers represented by the general formula (III) include dipentaerythritol tri(meth)acrylate, dipentaerythritol tetra(meth)acrylate, dipentaerythritol penta(meth)acrylate, dipentaerythritol hexa(meth)acrylate, tripentaerythritol tri(meth)acrylate, tripentaerythritol tetra(meth)acrylate, tripentaerythritol penta(meth)acrylate, tripentaerythritol hexa(meth)acrylate, etc. These monomers are easily cured by the irradiation of active energy rays, not only in an atmosphere of an inert gas such as nitrogen, argon or the like but also in air and form a film of excellent abrasion resistance; therefore, these monomers are particularly preferable.

By using a crosslinking-curable resin material consisting of at least one of the above monomers, there can be obtained a crosslinking-cured film with excellent surface smoothness and film uniformity and accordingly there can be easily produced a cured plastic film with smooth surface. This cured film made of the above crosslinking-curable resin material is excellent in abrasion with a plastic base material; therefore, there occurs no peeling of the cured film during use.

Together with the monomer having three or more (meth)acryloyloxy groups in one molecule, other monomers can be used. These other monomers have two or less (meth)acryloyloxy groups within the molecule and include, for example, 2,2-bis(4-acryloxydiethoxyphenyl)propane, 2,2-bis(4-methacryloxyethoxyphenyl)propane, diethylene glycol di(meth)acrylate, triethylene glycol di(meth)acrylate, tetraethylene glycol di(meth)acrylate, 2-hydroxyethyl (meth)acrylate, tetrahydrofurfuryl (meth)acrylate, ethylcarbitol (meth)acrylate, etc. These monomers are used alone or in combination in the crosslinking-curable resin material in an amount of 70% by weight or less.

In order to form, on the surface of the heat-resistant resin polymer base material, a cured film of a crosslinking curable resin having a film thickness of about 1 to 30

μm and adhesiveness strongly with said surface, it is desirable to coat the crosslinking-curable resin material on the required surface parts of the heat-resistant resin polymer base material according to a known method such as spray coating, casting coating, dip coating or the like and then to expose the resulting coating to active energy rays for crosslinking and curing.

As the active energy rays, there can be used electron rays, ultraviolet rays, etc. The use of ultraviolet rays is advantageous from standpoints of operation and handling. When ultraviolet rays are used as the active energy rays, it is preferable to add a photoinitiator and/or a photosensitizer to the crosslinking-curable resin material.

It is particularly preferable that the polyfunctional acrylate represented by the general formula (III) to used in combination with one of the compounds represented by the following general formula (IV)

$$R-(CH_2)_{n4}-\underset{\underset{(CH_2)_{n3}-R}{|}}{\overset{\overset{(CH_2)_{n2}-R}{|}}{C}}-(CH_2)_{n1}-OCO-(CH_2)_x-COO-(CH_2)_{m1}-\underset{\underset{(CH_2)_{m3}-R}{|}}{\overset{\overset{(CH_2)_{m2}-R}{|}}{C}}-(CH_2)_{m4}-R \quad (III)$$

(wherein at least three of the Rs are a $CH_2=CH-COO-$ group, the remainder of the Rs is a hydrogen atom, a hydroxyl group, an amino group, an alkylene group or a substituted alkylene group, $n_1$, $n_2$, $n_3$, $n_4$, $m_1$, $m_2$, $m_3$ and $m_4$ are 0, 1 or 2, and X is a positive integer of 1 to 10), for example, one of esterification products synthesized from such compound combinations as malonic acid/trimethylolethane/acrylic acid, malonic acid/trimethylolpropane/acrylic acid, succinic acid/trimethylolethane/acrylic acid, succinic acid/-trimethylolpropane/acrylic acid, adipic acid/trimethylolethane/acrylic acid, adipic acid/trimethylolpropane/acrylic acid and the like, at a proportion of compound (III)/compound (IV)=5 to 1/5, because the resulting molded article has excellent weather resistance and particularly has no appearance change such as roughened surface by accelerated spraying or natural spraying, crack, film peeling, poor adhesiveness, etc.

EFFECT OF THE INVENTION

The heat-resistant resin molded article with excellent abrasion resistance of the present invention is also excellent in surface smoothness, chemicals resistance, durability and adhesiveness after heating.

Such a heat-resistant resin molded article with excellent abrasion resistance can be used in required fields, for example, applications such as filter for CRTs, filter for TVs, displays such as taxi meter and digital display panel, illumination optics, filter for fluorescent display tubes, filter for liquid crystals and the like, and further in applications such as cover for automobile headlights and the like. Thus, this molded article has a very high industrial significance and value as a product capable of responding to the progress of car electronics.

The features and effects of the present invention as mentioned above will be explained in more detail by way of Examples. Parts and % used in Examples are parts by weight and % by weight unless otherwise specified.

Measurements and evaluations in Examples were made in accordance with the following methods.

(1) Abrasin resistance (a) Surface hardness: Pencil hardness in accordance with JIS K 5651-1966.
(b) Mar test: A Mar test using #00 steel wool.
o: Substantially no mar on surface by light rubbing.
Δ: Slight mar on surface by light rubbing.
x: Severe mar on surface by light rubbing. (about same mar as the base material will have.)

(2) Adhesiveness

Crosscut peeling test for crosslinking-cured film using cellophane adhesive tape 11 lengthwise cut lines and 11 breadthwise cut lines are drawn on a cured film so that the cut depth of each line reaches a base material and two adjacent lines are 1 mm apart to form 100 divisions each of 1 mm² on the cured film. A cellophane adhesive tape is sticked thereon and is peeled off rapidly.

This tape operation is repeated 30 times at the same place.
o: No peeling of crosslinking-cured film after 30 times operation.
Δ: 1 to 50 divisions peeled after 30 times operation.
x: 51 to 100 division peeled after 30 times operation.

Adhesiveness after heating

A resin molded article provided with a crosslinking-cured film was heated for 15 hr at 120° C. in a dry and hot constant temperature bath and then subjected to the crosscut peeling test for crosslinking-cured film using cellophane adhesive tape.

11 lengthwise cut lines and 11 breadthwise cut lines are drawn on a cured film so that the cut depth of each line reaches a base material and two adjacent lines are 1 mm apart to form 100 divisions each of 1 mm² on the cured film. A celophane adhesive tape is sticked thereon and is peeled off rapidly.

This tape operation is repeated 30 times at the same place.
o: No peeling of crosslinking-cured film after 30 times operation.
Δ: 1 to 50 divisions peeled after 30 times operation.
x: 51 to 100 divisions peeled after 30 times operation.

(3) Measurement of surface smoothness o: The film surface is very smooth and can be called a mirror surface.
Δ: The film surface is smooth but slightly irregular and can not be called a mirror surface.
x: The film surface is irregular and poor in smoothness.

EXAMPLE 1

In a 500 l dissolution tank were placed 100 parts of a sufficiently dried methyl methacrylate polymer [ACRYPET (trademark) VH having an intrinsic viscosity of 0.51, produced by Mitsubishi Rayon Co., Ltd.], 90 parts of toluene dehydrated, dried and refined and 10 parts of methanol dehydrated and dried, and they were subjected to stirring and dissolution at 80° C. The resulting solution was continuously supplied to a reaction tank at a rate of 5 kg/hr and the temperature inside the tank was controlled at 230° C. while sufficiently stirring the solution at a velocity of 90 rpm. Then, methylamine dried, filtered and refined was continuously supplied to the reaction tank at the rate of 30 mole/hr and the pressure inside the tank was controlled at 25 kg/cm$^2$ G. The temperature inside the reaction tank was controlled at 230° C. during reaction and an average residence time of 4.5 hr was employed. The reaction mixture was taken out from the reaction tank and sent to an aging tank by a pump, where aging was conducted with sufficient stirring using an average residence time of 2.0 hr and an inside-tank temperature of 230° C.

The aged reaction mixture was continuously supplied to a vent type extruder to separate and remove volatile matters. In the vent extruder, the temperature of the vent portion was kept at 230° C., that of the extrusion portion was kept at 230° C. and the vacuum degree of the vent portion was kept at 9 mmHg abs.

The strands extruded from the die were water-cooled and then cut to obtain a polymer of good transparency in a pellet form. On the other hand, toluene, methanol and unreacted methylamine discharged from the vent portion were cooled and recovered. The infrared absorption spectrum of the polymer showed absorptions inherent of N-methylmethacrylic imide, at 1,770, 1,660 and 750 cm$^{-1}$.

The polymer had a MI of 3.5 (230° C., 3.8 kg load), a refractive index of 1,536, a specific gravity of 1.210 and a heat distortion temperature of 175° C.

Next, this polymer was subjected to extrusion molding by the use of a vent type extruder of 25 mm in diameter manufactured by Daiichi Jitsugyo K.K. (die temperature: 230° C., adapter temperature: 230° C., screw barrel temperature: 200° C. to 230° C., screw L/D=24) and then pelletized. From the resulting pelletized polymer were produced heat-resistant flat molded plates of 80 mm×80 mm×2 mm by the use of a 1 ounce vertical injection molding machine of screw type (SAV 30A manufactured by Yamashiro Seiki Seisakusho). These plates had a pencil hardness of 2H. The plates were subjected to the mar test using steel wool, in which they showed severe mar on the surface by light rubbing.

On the surfaces of the above resin molded plates were uniformly dip-coated a crosslinking-curable resin material consisting of 30 parts of dipentaerythritol pentaacrylate, 30 parts of dipentaerythritol hexaacrylate, 20 parts of dipentaerythritol tetraacrylate, 20 parts of 2-hydroxyethyl acrylate and 4 parts of benzoin ethyl ether, using 200 parts of an isopropanol-toluene (6/4) mixed solvent. Then, the coated surfaces were exposed to ultraviolet rays emitted from a high pressure mercury lamp and were cured.

The thus obtained heat-resistant resin plates having on the surface a crosslinking-cured film of about 3 μm in thickness gave almost no mar when subjected to the mar test using #00 steel wool, and showed excellent abrasion resistance.

The crosslinking-cured film was very hard, had excellent adhesiveness with the base material and gave a very good result in the crosscut peeling test using cellophane adhesive tape. The film had a very good surface smoothness and was like a mirror surface.

In the adhesiveness after heating, the base material showed no change and remained good and there was no change in the surface smoothness of the film.

Comparative Example 1

From a sufficiently dried methyl methacrylate polymer [ACRYPET (trademark) VH having an intrinsic viscosity of 0.51, produced by Mitsubishi Rayon Co., Ltd.] were produced flat molded plates of 80 mm×80 mm×2 mm by the use of a 1 ounce vertical injection molding machine of screw type (SAV 30A manufactured by Yamashiro Seiki Seisakusho).

The molded plates had a pencil hardness of 2H. The plates were subjected to the mar test using steel wool, in which they showed severe mar on the surface by light rubbing.

On the surfaces of the above resin molded plates were uniformly dip-coated a crosslinking-curable resin material consisting of 30 parts of dipentaerythritol pentaacrylate, 20 parts of dipentaerythritol tetraacrylate, 20 parts of 2-hydroxyethyl acrylate and 4 parts of benzoin ethyl ether, using 200 parts of an isopropyl-toluene (6/4) mixed solvent. Then, the coated surfaces were exposed to ultraviolet rays emitted from a high pressure mercury lamp and were cured.

The thus obtained heat-resistant resin plates having on the surface a crosslinking-cured film of about 3μ in thickness were evaluated for adhesiveness after heating, in which the base material showed distortion and the cured film peeled easily.

EXAMPLE 2

By repeating the same reaction conditions and procedures as used in Example 1 except that the dried methylamine was changed to 1,3-dimethylurea and the latter's supply rate was set at 10 mole/hr, a methacrylic imide-containing polymer was obtained. This polymer had an imidization degree of 45% as measured from its NMR spectrum.

The polymer had a MI of 4.3, a refractive index of 1.510, a specific gravity of 1.21 and a heat distortion temperature of 149° C.

From the polymer were produced resin molded plates in the same procedure as in Example 1. These plates had a pencil hardness of H. The plates were subjected to the mar test using steel wool, in which they showed severe mar on the surface by light rubbing.

On the surfaces of these plates were uniformly dip-coated the crosslinking-curable resin material used in Example 1. The coated surfaces were then exposed to ultraviolet rays emitted from a high pressure mercury lamp and were cured.

The thus obtained heat-resistant resin plates having on the surface a crosslinking-cured film of about 3 μm in thickness gave almost no mar when subjected to the wear resistance test using #00 steel wool, and showed excellent abrasion resistance.

The crosslinking-cured film was very hard (pencil hardness 7H), had excellent adhesiveness with the base material and gave a very good result in the crosscut peeling test using cellophane adhesive tape. The film had a very good surface smoothness and was like a mirror surface.

The film was also good in adhesiveness after heating.

EXAMPLE 3

On the surfaces of the resin molded plates obtained in Example 1 were uniformly dip-coated a crosslinking-curable resin material solution consisting of the following components.

Dipentaerythritol pentaacrylate: 10 parts

Dipentaerythritol hexaacrylate: 10 parts
Tetrahydrofurfuryl acrylate: 8 parts
Ester obtained from reaction of 1 mole of succinic acid, 2 moles of trimethylolethane and 4 moles of acrylic acid: 7 parts
Isopropyl alcohol: 35 parts
Toluene: 30 parts
2-Hydroxy-2-methyl 1-phenylpropane-1-on: 2 parts
Silicon type levelling agent: 6.2 parts The coated surfaces were exposed to ultraviolet rays emitted from a high pressure mercury lamp and were cured. The thus obtained heat-resistant resin plates were excellent in abrasion resistance, adhesiveness, adhesiveness after heating and surface smoothness.

EXAMPLE 4

From a methyl methacrylate—methacrylic acid copolymer (weight ratio=80/20, intrinsic viscosity=0.45) was produced a methacrylic imide-containing polymer using the same imidizing substance, procedure and apparatuses as in Example 1.

With this polymer, there were prepared resin molded plates in the same procedure as in Example 1. On the surface of these plates were uniformly dip-coated the same crosslinking-curable resin material solution as used in Example 3. The coated surfaces were exposed to ultraviolet rays emitted from a high pressure mercury lamp and were cured.

The obtained resin molded plates were excellent in heat resistance, abrasion resistance, adhesiveness after heating, adhesiveness and surface smoothness.

EXAMPLE 5

By repeating the same reaction conditions and procedure as used in Example 1 except that the dried methylamine was changed to anhydrous ammonia gas and the latter's supply rate was set at 20 mole/hr, a methacrylic imide-containing polymer was obtained.

This polymer had an imidization degree of 45% as measured from its NMR spectrum.

The polymer had a MI of 4.3, a refractive index of 1.530, a specific gravity of 1.230 and a heat distortion temperature of 165° C.

Using the polymer, there were prepared resin molded plates in the same procedure as in Example 1. The plates had a pencil hardness of H. When subjected to the mar test using steel wool, the plates gave severe mar on the above resin molded plates was uniformly dip-coated the crosslinking-curable resin material of Example 1. The coated surfaces were exposed to ultraviolet rays emitted from a high pressure mercury lamp and were cured.

The thus obtained heat-resistant resin plates having on the surface a crosslinking-cured film of about 3 μm in thickness gave almost no mar when subjected to the mar test using #00 steel wool, and showed excellent abrasion resistance.

The crosslinking-cured film was very hard (pencil hardness 7H), had excellent adhesiveness with the base material and gave good results in the crosscut peeling test using cellophane adhesive tape and adhesiveness after heating. Also, the film had a very good surface smoothness.

EXAMPLE 6

By repeating the same reaction conditions and procedure as in Example 1 except that the dried methylamine was changed to urea and the latter's supply rate was set at 15 mole/hr, a methacrylic imide-containing polymer was obtained.

The infrared absorption spectrum of this polymer showed absorptions at 1,680 and 1,210 cm$^{-1}$ characteristic of methacrylic imide.

The polymer had a MI of 4.0 (230° C., 3.8 kg load), a refractive index of 1.536, a specific gravity of 1.237 and a heat distortion temperature of 170° C.

The imidization degree of the polymer as measured from its NMR spectrum was 53%.

Next, the above polymer was subjected to extrusion molding by the use of a vent type extruder of 25 mm in diameter manufactured by Daiichi Jitsugyo K.K. (die temperature: 230° C., adapter temperature: 230° C., screw barrel temperature: 200° to 230° C., full-flighted screw L/D=24) and then pelletized. From the resulting pelletized polymer were produced heat-resistant flat molded plates of 80 mm×80 mm×2 mm by the use of a 1 ounce vertical injection molding machine of screw type (SAV 30A manufactured by Yamashiro Seiki Seisakusho). These plates had a pencil hardness of 2H. The plates were subjected to the mar test using steel wool, in which they showed severe mar on the surface by light rubbing.

On the surfaces of the above resin molded plates were uniformly dip-coated a crosslinking-curable resin material consisting of 30 parts of dipentaerythritol pentaacrylate, 30 parts of dipentaerythritol hexaacrylate, 20 parts of dipentaerythritol tetraacrylate, 20 parts of 2-hydroxyethyl acrylate and 4 parts of benzoin ethyl ether, using 200 parts of an isopropanol-toluene (6/4) mixed solvent. Then, the coated surfaces were exposed to ultraviolet rays emitted from a high pressure mercury lamp and were cured.

The thus obtained heat-resistant resin plates having on the surface a crosslinking-cured film of about 3 μm in thickness gave almost no mar when subjected to the mar test using #00 steel wool and showed excellent abrasion resistance.

The crosslinking-cured film was very hard, had excellent adhesiveness with the base material and gave a very good result in the crosscut peeling test using cellophane adhesive tape. The film had a very good surface smoothness and was like a mirror surface.

The film was also good in adhesiveness after heating.

EXAMPLE 7

By repeating the same procedure as in Example 1 except that the methyl methacrylate polymer was changed to methyl methacrylate—methacrylic acid—tert-butyl methacrylate copolymer (weight ratio=60/20/20, intrinsic viscosity=0.55) and the dried methylamine was changed to anhydrous ammonia gas and the supply rate of anhydrous ammonia gas was set at 20 mole/hr, a methacrylic imidecontaining polymer was obtained.

From this polymer were prepared resin molded plates in the same procedure as in Example 1. The surfaces of these plates were uniformly coated by dipping in the same crosslinking-curable resin material solution as used in Example 1. The coated surfaces were exposed to ultraviolet rays emitted from a high pressure mercury lamp and were cured.

The thus obtained resin molded plates were excellent in heat resistance, abrasion resistance, adhesiveness, surface smoothness and adhesiveness after heating.

What is claimed is:

1. A heat-resistant resin molded article consisting of a resin molded article composed of 2% by weight or more of a structural unit represented by the following structure formula

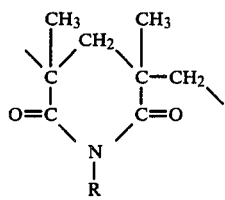 (I)

(wherein R is a hydrogen atom, an alkyl group, an aryl group or an alicyclic group of 1 to 20 carbon atoms) and 98% by weight or less of an ethylenic monomer unit and a cured film formed on the surface of said resin molded article by curing a crosslinking-curable resin material containing 30% by weight or more of at least one monomer having three or more (meth)acryloyloxy groups in one molecule.

2. A molded article according to claim 1, wherein the R in the structural formula (I) is a hydrogen atom, a methyl group, an ethyl group, a propyl group, an isopropyl group, a butyl group, an isobutyl group, a tert-butyl group, a phenyl or substituted phenyl group, a cyclohexyl group or a bornyl group.

3. A molded article according to claim 1, wherein the monomer having three or more (meth)acryloyloxy groups in one molecule is selected from poly(meth)acrylates obtained from reaction between a polyhydric alcohol and (meth)acrylic acid, polyester (meth)acrylates, urethane (meth)acrylates and poly((meth)acryloyloxyethyl)isocyanurates.

4. A molded article according to claim 1 or 3, wherein the monomer having three or more (meth)acryloyloxy groups in one molecule is a compound represented by the following general formula

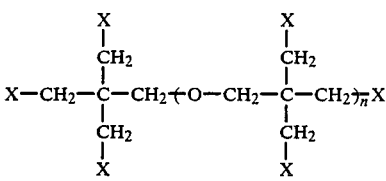 (III)

(wherein n is a positive integer of 1 to 4, at least three of the Xs are a $CH_2=CH-COO-$ group or a $CH_2=C(CH_3)COO-$ group, and the remainder of the Xs is a $-OH$ group).

5. A molded article according to claim 4, wherein the monomer represented by the general formula (III) is selected from dipentaerythritol tri(meth)acrylate, dipentaerythritol tetra(meth)acrylate, dipentaerythritol penta(meth)acrylate, dipentaerythritol hexa(meth)acrylate, tripentaerythritol tri(meth)acrylate, tripentaerythritol tetra(meth)acrylate, tripentaerythritol penta(meth)acrylate and tripentaerythritol hexa(meth)acrylate.

6. A molded article according to claim 1, wherein the crosslinking-curable resin material is composed of 30% by weight or more of at least one monomer having three or more (meth)acryloyloxy groups in one molecule and 75% by weight or less of a monomer having up to two (meth)acryloyloxy groups in one molecule.

7. A molded article according to claim 1, wherein the cured film has a film thickness of 1 to 30 μm.

8. A molded article according to claim 1, wherein the R in the structural formula (I) is a hydrogen atom or a methyl group.

9. A molded article according to claim 1, wherein the content of the structural unit represented by the structural formula (I) is 5% by weight or more.

10. A molded article according to claim 1, wherein the content of the structural unit represented by the structural formula (I) is 10% by weight or more.

* * * * *